United States Patent
Shen et al.

(10) Patent No.: US 10,368,128 B2
(45) Date of Patent: Jul. 30, 2019

(54) MEMORY ALLOCATION TYPE FOR MEDIA BUFFER

(71) Applicant: Microsoft Technology Licensing, LLC, Redmond, WA (US)

(72) Inventors: Fabin Shen, Redmond, WA (US); Christian Palmer Larson, Kirkland, WA (US); Sang K. Choe, Redmond, WA (US); Mei Ling Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/675,270

(22) Filed: Aug. 11, 2017

(65) Prior Publication Data

US 2019/0050957 A1    Feb. 14, 2019

(51) Int. Cl.
*H04N 21/443*  (2011.01)
*G06F 9/50*   (2006.01)
*G06T 1/00*   (2006.01)
*G06T 1/60*   (2006.01)
*H04N 5/232*  (2006.01)
*G06F 9/54*   (2006.01)

(52) U.S. Cl.
CPC ....... *H04N 21/4435* (2013.01); *G06F 9/5016* (2013.01); *G06F 9/544* (2013.01); *G06T 1/0007* (2013.01); *G06T 1/60* (2013.01); *H04N 5/232* (2013.01); *H04N 5/23203* (2013.01)

(58) Field of Classification Search
CPC ............. H04N 5/23203; H04N 21/443; H04N 21/4435; H04L 29/08171; H04L 67/1008; H04L 2012/5631; H04W 28/0215; G06T 1/0007; G06T 1/60; G06F 9/5016; G06F 9/5038; G06F 9/5044; G06F 9/5055; H04H 20/42
See application file for complete search history.

(56) References Cited

U.S. PATENT DOCUMENTS 9,448,920 B2   9/2016  Erdmann et al.
9,519,426 B2   12/2016 Iyengar
9,558,040 B2   1/2017  Maillet et al.
(Continued)

OTHER PUBLICATIONS

"International Search Report and Written Opinion Issued in PCT Application No. PCT/US2018/035934", dated Sep. 20, 2018, 12 Pages.

*Primary Examiner* — Lin Ye
*Assistant Examiner* — Chriss S Yoder, III
(74) *Attorney, Agent, or Firm* — Arent Fox LLP

(57) ABSTRACT

Methods and devices for allocating memory for use with a camera resources may include receiving camera resource requests from application plurality of applications to use a camera resource. The methods and devices may include determining a memory type to allocate to the applications for the camera resource based on the camera resource request and compatibility information of the camera resource. The methods and devices may include determining a buffer and a buffer type to provide each of the applications based on an access mode of the camera resource, wherein the buffer type comprises one or more of a shared type, a copy type, and a secure type. The methods and devices may include providing the application access to the buffer based on the determination.

19 Claims, 6 Drawing Sheets

(56) References Cited

U.S. PATENT DOCUMENTS

| | | |
|---|---|---|
| 2004/0221288 A1 | 11/2004 | Lisitsa et al. |
| 2005/0268302 A1* | 12/2005 | Geib ................. G06F 9/4881 718/100 |
| 2006/0050155 A1* | 3/2006 | Ing ..................... G06F 3/005 348/231.99 |
| 2011/0307677 A1 | 12/2011 | David et al. |
| 2014/0223098 A1 | 8/2014 | Lee et al. |
| 2014/0304485 A1 | 10/2014 | Joshi |
| 2016/0188454 A1 | 6/2016 | Spradlin et al. |

\* cited by examiner

MEMORY ALLOCATION TYPE FOR MEDIA BUFFER

BACKGROUND

The present disclosure relates to memory allocation.

When multiple applications want to use camera resources on a computer device, the type of memory and/or memory access allocated to the applications may be different than what an application needs. As such, system resources may be unnecessarily used when allocating the memory to the application. Moreover, system performance may be impacted when memory is unnecessarily allocated for camera resources on a computer device.

Thus, there is a need in the art for improvements in memory allocation.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to receive camera resource requests from a plurality of applications to use a camera resource, determine a memory type to allocate to the applications for the camera resource based on the camera resource request and compatibility information of the camera resource, determine a buffer and a buffer type to provide each of the applications based on an access mode of the camera resource, wherein the buffer type comprises one or more of a shared type, a copy type, and a secure type, and provide the applications access to the buffer based on the determination.

Another example implementation relates to a method for allocating memory for use with a camera resources. The method may include receiving, at an operating system executing on a computer device, camera resource requests from a plurality of applications to use a camera resource. The method may also include determining a memory type to allocate to the applications for the camera resource based on the camera resource request and compatibility information of the camera resource. The method may also include determining a buffer and a buffer type to provide each of the applications based on an access mode of the camera resource, wherein the buffer type comprises one or more of a shared type, a copy type, and a secure type. The method may also include providing the applications access to the buffer based on the determination.

Another example implementation relates to computer-readable medium storing instructions executable by a computer device. The computer-readable medium may include at least one instruction for causing the computer device to receive camera resource requests from a plurality of applications to use a camera resource. The computer-readable medium may include at least one instruction for causing the computer device to determine a memory type to allocate to the applications for the camera resource based on the camera resource request and compatibility information of the camera resource. The computer-readable medium may include at least one instruction for causing the computer device to determine a buffer and a buffer type to provide each of the applications based on an access mode of the camera resource, wherein the buffer type comprises one or more of a shared type, a copy type, and a secure type. The computer-readable medium may include at least one instruction for causing the computer device to provide the applications access to the buffer based on the determination.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
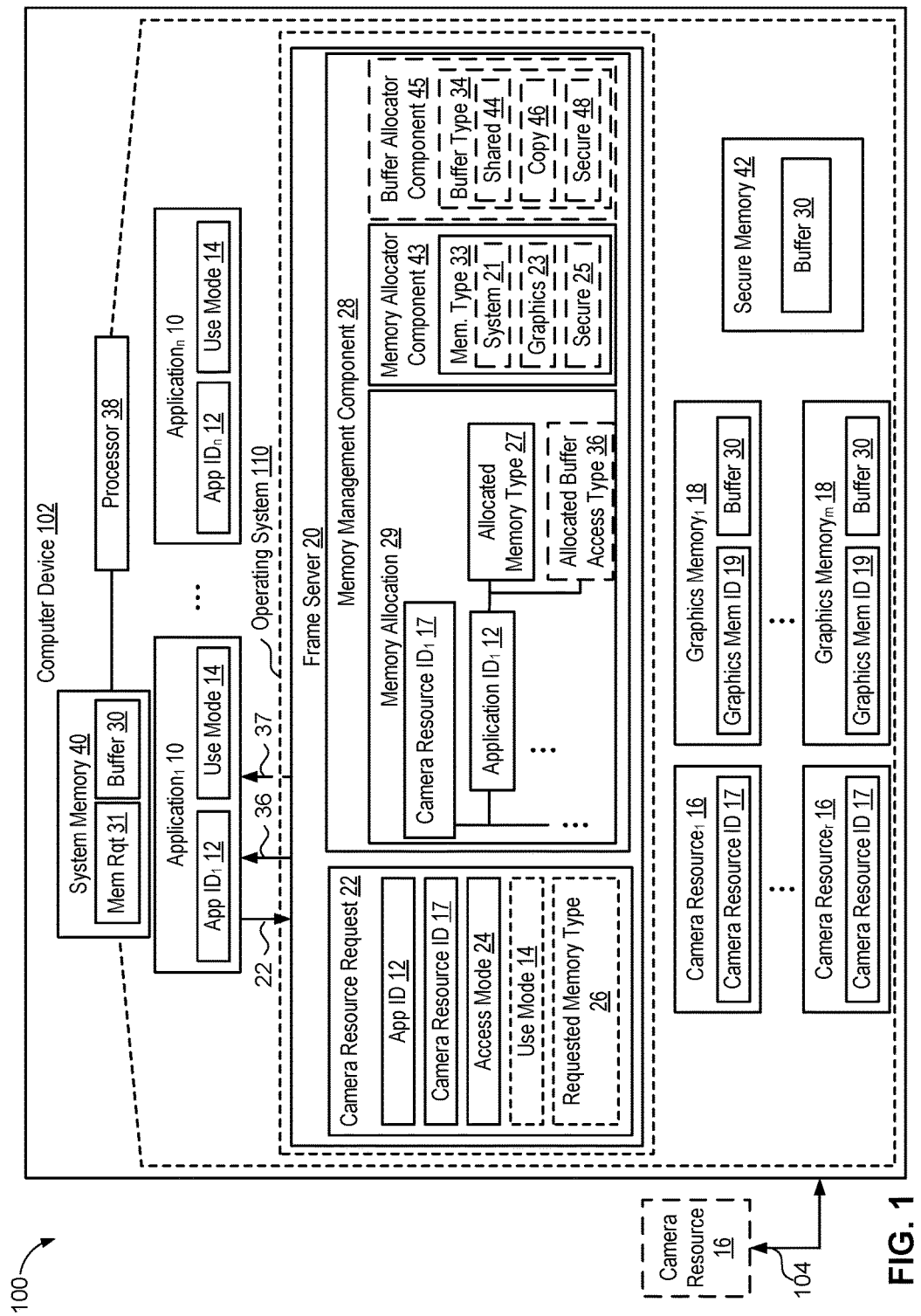
FIG. 1 is a schematic block diagram of an example computer device in accordance with an implementation of the present disclosure.

This disclosure relates to devices and methods for memory allocation and management for various camera resources on a computer device. The devices and methods may include a memory management component that applies one or more policies to make a decision as to how to manage memory allocation for different applications that may want to use the camera resources on a computer device. For example, the memory management component may determine what memory type (e.g., system memory, graphics memory, or secure memory) may be allocated to the applications and/or what access mode type (e.g., read/write or read only) for accessing the memory allocated to the applications. The type of memory and/or the type of access mode that is allocated may be based on a camera resource request received from a respective application for use of the camera resource, as well as any memory requirements of the camera resource.

The memory management component may also determine whether to share the same memory buffer between two or more applications, which may result in a reduction of in the amount of memory used and/or may result in a reduction in copying of the memory buffers. For example, when the access mode is read only, the memory management component may share the same memory buffer between multiple applications, which may minimize a number of copies of the memory buffer provided to the applications and may improve system processing. In addition, the memory management component may secure multiple applications at the same time by providing different secure memory buffers to the applications.

In an implementation, the memory management component may intercept all camera resource requests for camera operations from the various applications. The memory management component may apply a policy to make a decision to determine a memory type to allocate to the applications based on the camera resource request and/or any memory requirements of the camera resource. For example, if a first application sends a camera resource request to use a camera with a read only access request, the memory management component may provide the application a handle that points to a memory location to access a shared buffer for the camera. If a second application sends a camera resource request for the camera with a read and write access request, the memory management component may provide a copy of the buffer for the camera to the second application.

As each application sends a camera resource request for a camera operation, the memory management component may dynamically ensure each application gets a sufficient type and amount of memory, and a suitable access type, by updating the memory allocated to the application based on the camera resource request. Moreover, as graphics processing units (GPUs) are added and/or removed from the computer device, the memory management component may dynamically switch the allocated memory to a different GPU and/or different memory type, such as from graphics memory to system memory.

Thus, by intercepting all requests for camera operations from the various applications, the memory management component may optimize the memory allocation process by ensuring that each application gets suitable access to a sufficient type and amount of memory to use. In addition, by sharing memory buffers when possible, efficiency in the use of system processing may be improved by reducing a number of copies of memory buffers required. As a result, the disclosed devices and methods may optimize system performance, minimize memory usage, and/or minimize copying.

Referring now to FIG. 1, illustrated therein is an example computer device 102 for use with memory allocation and management for various applications 10 on computer device 102. Computer device 102 may include a plurality of applications 10 (e.g., up to n applications, where n is a positive number) executed or processed by processor 38 and/or system memory 40 of computer device 102. Applications 10 may use one or more camera resources 16 (e.g., up to r, where r is a positive number) to capture a scene and/or perform video processing. Each application 10 may have an application identification (ID) 12 that identifies the application 10 requesting use of a camera resource 16. The application ID 12 may include, but is not limited to, a number, a name, or other unique identifier that may identify which application 10 is requesting use of a camera resource 16.

The one or more camera resources 16 may be in communication with computer device 102 via a wired or wireless connection 104. Camera resources 16 in communication with computer device 102 may include, but are not limited to, virtual cameras, cameras connected via a Universal Serial Bus (USB), and a webcam. Each camera resource 16 may be associated with a camera resource identification (ID) 17, a number, a name, or other unique identifier, that identifies a specific camera resource 16.

Application 10 may also indicate a use mode 14, such as a control mode or a shared mode for operating when using one or more camera resources 16. In other words, the use mode 14 identifies whether the application 10 wants control of the camera resource 16 or is willing to share access to the camera resource 16. If the use mode 14 is the control mode, application 10 may control the parameters of the camera resource 16. For example, when application 10 is in the control mode, application 10 may change the characteristics or parameters, e.g., a stream format and/or other controls, on camera resource 16. If the use mode 14 is the sharing mode, application 10 may use the camera resource 16 under the existing conditions (e.g., control may not be available to set the characteristics at which the camera resource 16 is currently being used). In an example use case, a first application 10 (e.g., the Windows Hello application) may be set in a control mode to control camera resources 16 such as an IR sensor and color sensor (e.g., Windows Hello set the controls on the camera resource 16). A second application (e.g., the Skype application) may be set in a share mode, and may initiate a video call using the camera resources 16 while the Windows Hello application has control of the color sensor and is operating the RGB camera at a lower resolution than may be desired. While the Skype application prefers to have a higher resolution, the Skype application in the share mode may initiate the video call at the lower resolution that is available for sharing, instead of not initiating the call (e.g., if the higher resolution was required).

In addition, computer device 102 may include an operating system 110 executed by processor 38 and/or system memory 40 of computer device 102. System memory 40 may be configured for storing data and/or computer-executable instructions defining and/or associated with operating system 110, and processor 38 may execute operating system 110. An example of system memory 40 can include, but is not limited to, a type of memory usable by a computer, such as random access memory (RAM), read only memory (ROM), tapes, magnetic discs, optical discs, volatile memory, non-volatile memory, and any combination thereof. An example of processor 38 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include a frame server 20 operable to manage one or more camera resources 16 operating on and/or in communication with computer device 102. Frame server 20 may receive one or more camera resource requests 22 from applications 10 to use at least one camera resource 16. The camera resource request 22 may include the application ID 12 that identifies the application 10 requesting use of one or more of the camera resources 16, one or more camera resource IDs 17 corresponding to the requested one or more camera resources 16, and the access mode 24 that identifies a level of access to the memory and/or a memory buffer associated with the camera resource 16. The access mode 24 may include, but is not limited to, a read request, a write request, and a read and write request.

In addition, the camera resource request 22 may optionally include the use mode 14 of the camera resource 16. For example, application 10 may identify whether application 10 wants to use the camera resource 16 in the control mode and/or the shared mode. The camera resource request 22 may also optionally include a requested memory type 26 identified by application 10. The requested memory type 26 may include, but is not limited to, one of a plurality of values each corresponding to one of a plurality of different types of memory (e.g., system memory 40, graphics memory 18, or secure memory 42) requested to be used. For instance, computer device 102 may include one or more graphics memories 18 (e.g., up to m, where m is a positive number), where each graphics memory 18 may correspond to a respective one or more graphics processing units (GPUs) of the computer device 102. Further, computer device 102 may include at least one secure memory 42 located in a secure portion of operating system 110 which limits access to secure memory 42 to avoid tampering, etc. For example, application 10 may set the requested memory type 26 to a value corresponding to graphics memory 18 to request to use graphics memory 18 for the processing associated with the use of the identified camera resource 16.

Frame server 20 may include a memory management component 28 having a memory allocator component 43 operable to allocate memory to one or more applications 10 in response to the camera resource request 22. For each camera resource request 22, memory management component 28 may determine an allocated memory type 27 that identifies which type of memory to allocate to each requesting application 10 for using each requested camera resource 16. The allocated memory type 27 may identify a memory type 33 such as, but not limited to, a system type 21 corresponding to system memory 40, a graphics type 23 corresponding to graphics memory 18, and a secure type 25 corresponding to secure memory 42. When computer device 102 has a plurality of graphics memory 18 (e.g., multiple graphics processing units (GPUs)) that may be accessed, the graphics memory 18 to be allocated may be identified by a graphics memory ID 19. In addition, memory allocator component 43 may assign different types of memory for different camera resources 16. For example, allocated memory type 27 assigned by memory management component 28 may identify system memory 40 for use with a first camera resource 16 and may identify graphics memory 18 for use with a second camera resource 16. Alternatively, or in addition, memory allocator component 43 may assign the same or different types of memory for the same camera resources 16 to different applications 10. For example, allocated memory type 27 assigned by memory management component 28 may identify system memory 40 for use with both a first application 10 and a second application 10 for a first camera resource 16. Thus, in response to each camera resource request 22, memory allocator component 43 defines a memory allocation 29 that associates the application ID 12 of the requesting application with the camera resource ID 17 of the requested camera resource 16, and further associates the allocated memory type 27 with the application ID 17 to define what memory should be used by the application 10 when using the camera resource 16.

Memory management component 28 may prioritize the received camera resource requests 22 from applications 10 when determining the memory allocation 29. For example, if a use mode 14 of one application 10 is a control mode, memory management component 28 may prioritize a requested memory type 26 received from the application 10 relative to other requested memory types 26 received.

It should be noted that although memory allocation 29 as illustrated in FIG. 1 only includes a single allocated memory type 27 (and, optionally, a single allocated buffer access type 36) for a single application 10 for a single camera resource ID 17, memory allocation 29 may include multiple camera resource IDs 17 and each camera resource ID 17 may be associated with one or more application IDs 12 each having a respective allocation memory type 27 (and, optionally, allocated buffer access type 36) assignment.

In some cases, memory allocator component 43 of memory management component 28 may use the information from the camera resource request 22, along with stored camera memory requirements or compatibility information 31, when determining the allocated memory type 27 for the requested camera resource 16. The camera requirements or compatibility information 31, which may be stored in system memory 40, may identify the memory type 33 for use with the given camera resource 16, or may identify the memory type 33 that cannot be used with the given camera resource 16. For example, application 10 may send camera resource request 22 including requested memory type 26 that identifies a request to use graphics memory 18. Memory allocator component 43 of memory management component 28 may use the camera resource ID 17 in camera resource request 22 to identify the corresponding camera resource 16 and any corresponding memory requirements 31 for the selected camera resource 16. In this case, for instance, the camera resource 16 corresponding to the camera resource ID 17 may identify a USB camera, and the corresponding camera memory requirements 31 may identify that the USB camera does not support graphics memory 18 and/or that the USB camera is to be used with system memory 40. Consequently, in this case, memory allocator component 43 of memory management component 28 may determine that the USB camera is unable to support graphics memory 18 and may instead select system memory 40 as the allocated memory type 27 to be used with the USB camera by the requesting application 10 based on the stored memory requirements 31 associated with the requested USB camera. Alternatively, when the requested memory type 26 matches with the camera requirements or compatibility information 31, then memory allocator component 43 of memory management component 28 may assign the requested memory type 26 to the application 10 for use with the camera resource 16. In addition, if a new application 10 requests a different requested memory type 26 than what is currently in use, memory management component 28 may update the allocated memory type 27 assigned to the application 10 based on the camera resource request 22 received from the new application. As such, the memory allocator component 43 of memory management component 28 may use any memory requirements 31 for the camera resources 16 in combination with any specific requests made by application 10 in the camera resource request 22 when determining the allocated memory type 27 assigned to the requesting application 10 for using the requested camera resource 16.

In addition to taking into account the requested memory type 26 and the camera requirements or compatibility information 31, memory allocator component 43 of memory management component 28 may switch between different memory types 33 based on power needs of computer device 102. For example, if a power level of the computer device 102 is below a power level threshold, memory allocator component 43 of memory management component 28 may switch the allocated memory type 27 to a less power consuming type of memory, as compared to an amount of power consumption of a current memory, to help conserve battery power. It should be understood that an amount of power consumption of a type of memory may vary, but in one example, for instance, the graphics memory 18 may consume more power than the system memory 40. When the power level increases above the power level threshold amount, memory management component 28 may reallocate the allocated memory type 27 assigned to one or more applications 10 for one or more camera resources 16 based on specific requests from applications 10 and/or the camera requirements or compatibility information. For example, memory management component 28 may switch the allocated memory type 27 provided to application 10 from the less power consuming type of memory to a more power consuming type memory.

Optionally, memory management component 28 may also provide each application 10 access to a buffer 30 having a buffer type 34 to use in connection with the camera resource 16 in response to the camera resource request 22. Memory management component 28 may include a buffer allocator component 45 to determine the allocated buffer type 36 of the buffer 30 to provide application 10. Generally, each camera resource 16 is associated with a corresponding buffer 30, e.g., a portion or location in one of the allocated memory type 27 (e.g., the system memory 40, the graphics memory 18, or the secure memory 42) for storing the output of the camera resource 16. Further, the buffer allocator component 45 may choose between different buffer types 34, where the allocated buffer access type 36 may be one of a plurality of values that identifies one of the plurality of buffer types 34 including, but not limited to, a shared type 44, a copy type 46, and a secure type 48. The shared type 44 of buffer 30 is a common buffer in one of the memories, where the common buffer is used by two or more applications 10. The copy type 46 of buffer 30 is an independent buffer that is a copy of a primary buffer used by the camera resource. The secure type 48 of buffer 30 is a buffer in the secure memory 42 in the secure portion of the operating system 110. For instance, if multiple applications 10 are requesting use of the same camera resource 16, the buffer allocator component 45 may assign the same or different buffer types 34 to each application 10 based on the camera resource requests 22 received from the applications 10. Buffer allocator component 45 may determine what buffer type 34 to allocate to minimize buffer copying and/or memory consumption by applications 10.

For example, buffer allocator component 45 may use the information received in the camera resource request 22 to determine the buffer type 34 to select as the allocated buffer access type 36. For instance, buffer allocator component 45 may use the access mode 24 to determine the allocated buffer access type 36. In one implementation, for instance, buffer allocator component 45 may use the shared type 44 when the access mode 24 is read only. In addition, for instance, buffer allocator component 45 may use the copy type 46 when the access mode 24 is read and write. Thus, for each application 10 requesting the use of the camera resource 16, buffer allocator component 45 may use the access mode 24 identified in a respective camera resource request 22 to determine which buffer type 34 to assign at the allocated buffer access type 36 for use by the respective application 10 with the requested camera resource 16.

Moreover, if the access mode 24 changes for a specific application 10, buffer allocation component 45 may dynamically update the allocated buffer access type 36 assigned to the application 10. For example, if application 10 switches from a read only access mode 24 to a read/write access mode 24, the buffer type 34 changes and the allocated buffer access type 36 selected for application 10 may change from the shared type 44 to the copy type 46. By using the buffer 30 of the shared type 44 between multiple applications 10, system processing may be improved by reducing a number of copies of memory buffers required.

Frame server 20 may communicate the allocated buffer access type 36 to application 10 in response to the camera resource request 22. The allocated buffer access type 36 may identify a buffer 30 and access permissions to application 10. In some cases, however, the buffer type 34 indicated by the allocated buffer access type 36 may be transparent to application 10. Thus, application 10 may use the buffer 30 provided without knowing whether the buffer 30 is the shared type 44, the copy type 46, or the secure type 48.

When applications 10 are added and/or removed from using the camera resource 16, memory management component 28 may dynamically update the memory allocation for the respective application(s) 10 based on the additions and/or removals. As each application 10 sends the camera resource request 22 for a camera operation, memory management component 28 may dynamically ensure each application 10 gets a sufficient type and amount of memory, and/or a suitable access type, by updating the buffer 30 allocated to the applications 10 based on the camera resource requests 22.

Moreover, as graphics process unit (GPU)s are added and/or removed from the computer device 102, the memory management component 28 may dynamically switch the allocated memory to a different allocated memory type 27, as needed. For example, when a user removes a keyboard portion of a tablet computer and is using a screen portion of the tablet to conduct a Skype application video call, memory management component 28 may dynamically switch the allocated memory from the graphics memory 18 on the keyboard portion to the graphics memory 18 on the screen portion of the tablet.

In addition, memory management component 28 may not allocate a memory type 27 to applications 10 and may provide a notification 37 to applications 10 indicating that a memory type 27 may not be allocated to applications 10. For example, if one application 10 is allocated a secure type 25 memory, additional applications 10 may be prevented from receiving a memory type allocation 27 and/or accessing the camera resource 16. As such, the additional applications 10 may receive notification 37 indicating that the camera resource 16 is in use.

Thus, by intercepting all camera resource requests 22 for camera operations from the various applications 10, memory management component 28 may optimize the memory allocation process by ensuring that each application 10 gets suitable access to a sufficient type and amount of memory to use. In addition, by sharing memory buffers 30 when possible, system processing may be improved by reducing a number of copies of memory buffers required.

Figure 2:
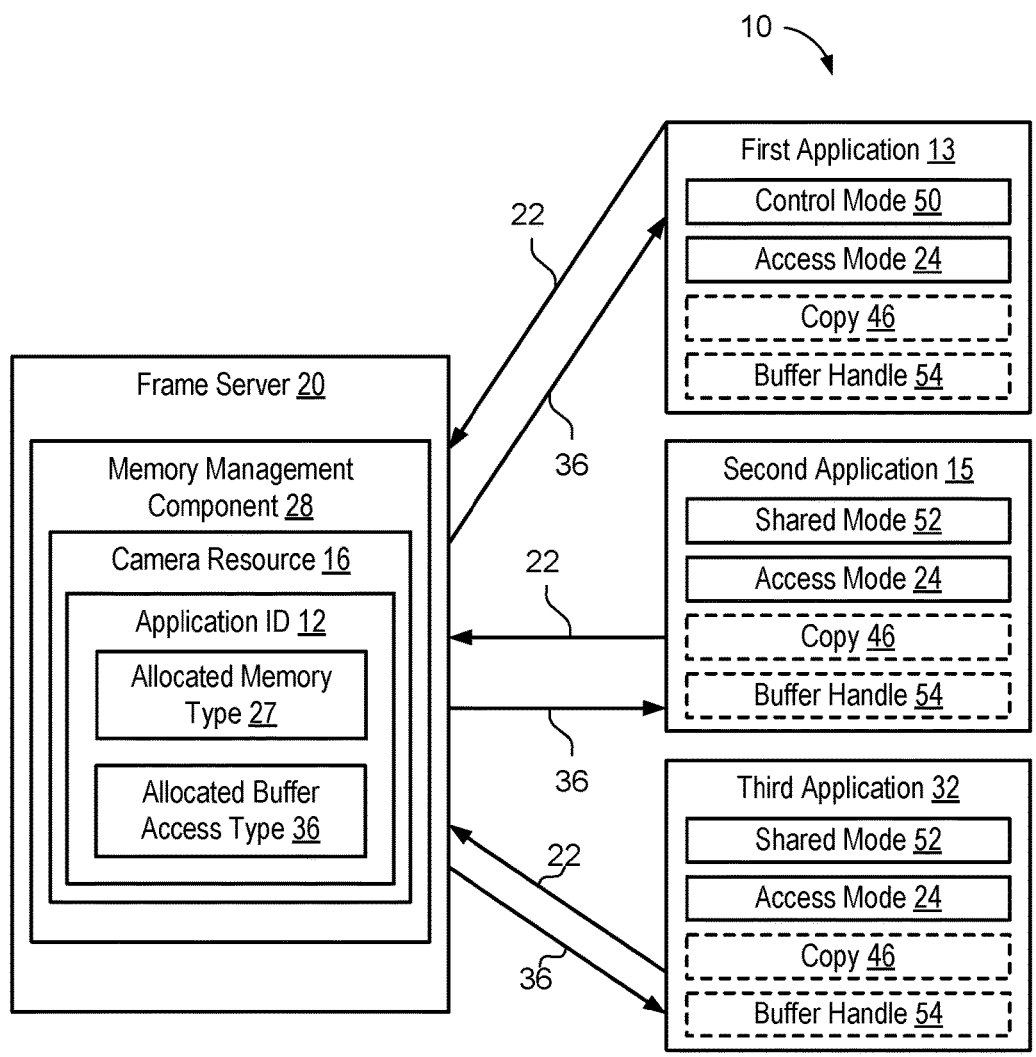
FIG. 2 is a schematic block diagram of a plurality of applications sending camera resource requests for use of a camera resource in accordance with an implementation of the present disclosure.

Referring now to FIG. 2, an example use case may include a plurality of applications 10 (e.g., first application 13, second application 15, and third application 32) sending camera resource requests 22 to use the same camera resource 16 associated with computer device 102 (FIG. 1). Frame server 20 may receive the various camera resource requests 22 from first application 13, second application 15, and third application 32. In the illustrated example, first application 13 may be in a control mode 50 of camera resource 16. As such, first application 13 may determine the parameters of camera resource 16. For example, first application 13 may change the characteristics or parameters, e.g., a stream format and/or other controls, on camera resource 16. Second application 15 and third application 32 may be in a shared mode 52 of camera resource 16. Thus, second application 15 and third application 32 may use camera resource 16 under the existing parameters set by first application 13.

For example, first application 13 may specify graphics type 23 (FIG. 1) as the requested memory type 26 that first application 13 wants to use with camera resource 16 in the camera resource request 22. In contrast, second application 15 may specify system type 21 (FIG. 1) as the requested memory type 26 that second application 15 wants to use with camera resource 16 and third application 32 may not specify a requested memory type 26 in the camera resource request 22.

Memory management component 28 may execute memory allocator component 43 to use the requested memory types 26 specified in the various camera resource requests 22, along with any memory requirements 31 associated with camera resource 16, in determining an allocated memory type 27 that identifies which type of memory to allocate to first application 13, second application 15, and third application 32. For instance, memory management component 28 and/or memory allocator component 43 may allocate a graphics type 23 corresponding to graphics memory 18 to first application 13, second application 15, and third application 32 based on the camera resource request 22 of the first application 13. The camera resource request 22 of the first application 13 may be prioritized by memory management component 28 and/or memory allocator component 43 because the first application 13 was granted a control mode 50 of the camera resource 16.

In addition, memory management component 28 and/or memory allocator component 43 may communicate with buffer allocator component 45 (FIG. 1) to determine an allocated buffer type 36 of the buffer 30 (FIG. 1) and a size of the buffer 30 to provide to first application 13, second application 15, and third application 32 and may provide buffer access 36 to first application 13, second application 15, and third application 32. Buffer allocator component 45 may use the information received in the camera resource request 22 to determine the buffer type 34 to select as the allocated buffer access type 36. For example, if first application 13 indicates in the camera resource request 22 that the access mode 24 of first application 13 is read only, buffer allocator component 45 may determine that the allocated buffer access type 36 for the first application 13 may be a shared type 44. Memory management component 28 may provide first application 13 with a buffer handle 54 that points to the shared type 44 for the buffer 30 allocated for camera resource 16 so that first application 13 may access the shared buffer. If second application 15 indicates in the camera resource request 22 that the access mode 24 of second application 15 is read and write, buffer allocator component 45 may determine that the allocated buffer access type 36 for the second application 15 may be the copy type 46 so that second application 15 may modify the buffer as requested. If third application 32 indicates in the camera resource request 22 that the access mode 24 of third application 32 is read only, buffer allocator component 45 may determine that the allocated buffer access type 36 for the third application 32 may be the shared type 44. As such, memory management component 28 may provide the third application 32 with a buffer handle 54 that points to the shared type 44 for the buffer 30 allocated for camera resource 16 so that the third application 32 may access the shared buffer of camera resource 16. By providing first application 13 and third application 32 with access to a shared buffer 44, system resources may be conserved by reducing a number of buffer copies provided to first application 13, second application 15, and third application 32.

In addition, if first application 13, second application 15, and third application 32 modify the access mode 24, buffer allocation component 45 may modify the allocated buffer access type 36 assigned to first application 13, second application 15, and third application 32 based upon the updated access mode 24 information. For example, if first application 13 switches the access mode 24 from read only to a read/write access mode 24, the buffer type 34 allocated to first application 13 may change and the allocated buffer access type 36 selected for first application 13 may change from a shared type 44 to a copy type 46. In addition, if second application 15 switches the access mode 24 from a read/write access mode 24 to a read only access mode 24, the buffer type 34 allocated to second application 15 may change and the allocated buffer access type 36 selected for second application 15 may change from a copy type 46 to a shared type 44. Memory management component 28 may provide second application 15 with a buffer handle 54 that points to the shared type 44 for the buffer 30 allocated for camera resource 16 so that second application 15 may access the shared buffer of camera resource 16. Moreover, if third application 32 switches the access mode 24 from read only access mode 24 to a read/write access mode 24, the buffer type 34 allocated to third application 32 may change and the allocated buffer access type 36 selected for third application 32 may change from a shared type 44 to a copy type 46. By dynamically updating the buffer types 34 selected for first application 13, second application 15, and third application 32, memory management component 28 may optimize the memory allocated based on current requirements of first application 13, second application 15, and third application 32 so that inefficiencies of system performance may be reduced while satisfying requirements of first application 13, second application 15, and third application 32.

Figure 3:
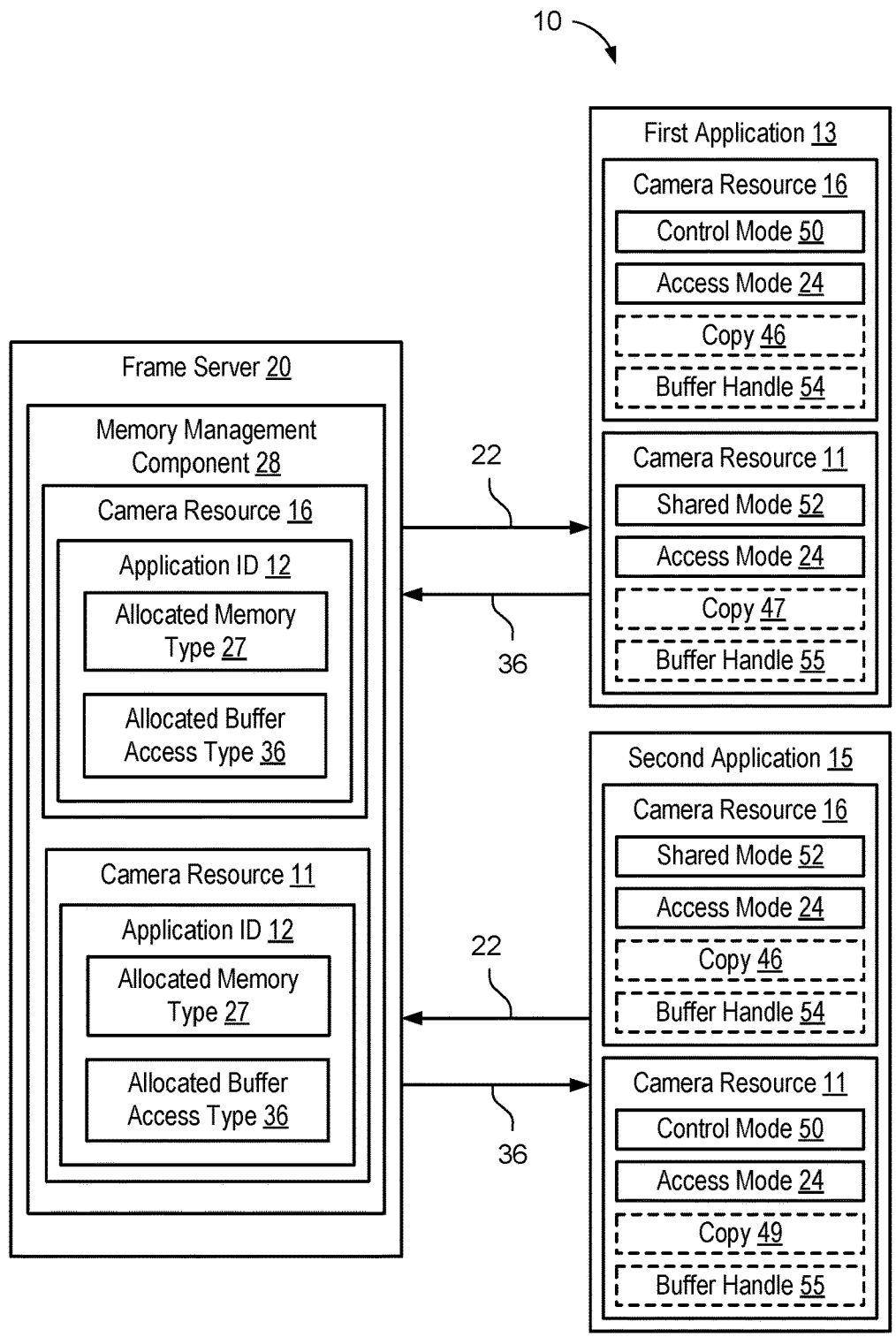
FIG. 3 is a schematic block diagram of a plurality of applications sending camera resource requests for use of a plurality of camera resources in accordance with an implementation of the present disclosure.

Referring now to FIG. 3, an example use case may include a plurality of applications 10 (e.g., first application 13 and second application 15) sending camera resource requests 22 to use a plurality of camera resources 11 and 16 associated with computer device 102 (FIG. 1). Frame server 20 may receive the various camera resource requests 22 from first application 13 and second application 15. In the illustrated example, first application 13 may be in a control mode 50 of camera resource 16 while in a shared mode 52 of camera resource 11. In addition, second application 15 may be in a control mode 50 of camera resource 11, while in a shared mode 52 of camera resource 16. As such, first application 13 may determine the parameters of camera resource 16 and second application 15 may determine the parameters of camera resource 11. First application 13 may use camera resource 11 under the existing parameters set by second application 15, and second application 15 may use camera resource 16 under the existing parameters set by first application 13.

For example, first application 13 may specify graphics type 23 (FIG. 1) as the requested memory type 26 that first application 13 wants to use with camera resource 16 in the camera resource request 22. Second application 15 may specify system type 21 (FIG. 1) as the requested memory type 26 second application 15 wants to use with camera resource 11. As such, memory management component 28 may execute memory allocator component 43 to use the requested memory types 26 specified in the various camera resource requests 22, along with any memory requirements 31 associated with camera resources 11 and 16, in determining an allocated memory type 27 that identifies which type of memory to allocate to first application 13 and second application 15. For instance, memory management component 28 and/or memory allocator component 43 may allocate a graphics type 23 corresponding to graphics memory 18 as the allocated memory type 27 to use with camera resource 16. In addition, memory management component 28 and/or memory allocator component 43 may allocate system type as the allocated memory type 27 to use with camera resource 11. Thus, camera resources 11, 16 may have different allocated memory types 27 allocated for use with the camera resources 11, 16.

In addition, memory management component 28 and/or memory allocator component 43 may communicate with buffer allocator component 45 (FIG. 1) to determine an allocated buffer type 36 of the buffer 30 (FIG. 1) and a size of the buffer 30 to provide to first application 13 and second application 15 and may provide buffer access 36 to first application 13 and second application 15. For example, if first application 13 indicates in the camera resource request 22 that the access mode 24 of first application 13 is read only for camera resource 16, buffer allocator component 45 may determine that the allocated buffer access type 36 for first application 13 may be a shared type 44. Memory management component 28 may provide first application 13 with a buffer handle 54 that points to the shared buffer type 44 for the buffer 30 allocated for camera resource 16 so that first application 13 may access the shared buffer. If second application 15 indicates in the camera resource request 22 that the access mode 24 of second application 15 is a read/write access mode 24 for camera resource 16, buffer allocator component 45 may determine that the allocated buffer access type 36 for the second application 15 may be the copy type 46 so that second application 15 may modify the buffer as requested.

In addition, if first application 13 and second application 15 indicate in the camera resource request 22 that the access modes 24 of first application 13 and second application 15 are read only for camera resource 11, buffer allocator component 45 may determine that the allocated buffer access type 36 for the first application 13 and second application 15 may be the shared type 44. Memory management component 28 may provide first application 13 and second application 15 with a buffer handle 55 that points to the shared type 44 for the buffer 30 allocated for camera resource 11 so that first application 13 and second application 15 may access the shared buffer of camera resource 11. The allocated buffer access type 36 first application 13 and second application 15 may receive for each camera resource 11 and 16 may change based on the access modes 24 of first application 13 and second application 15 for the various camera resources 11 and 16.

Figure 4:
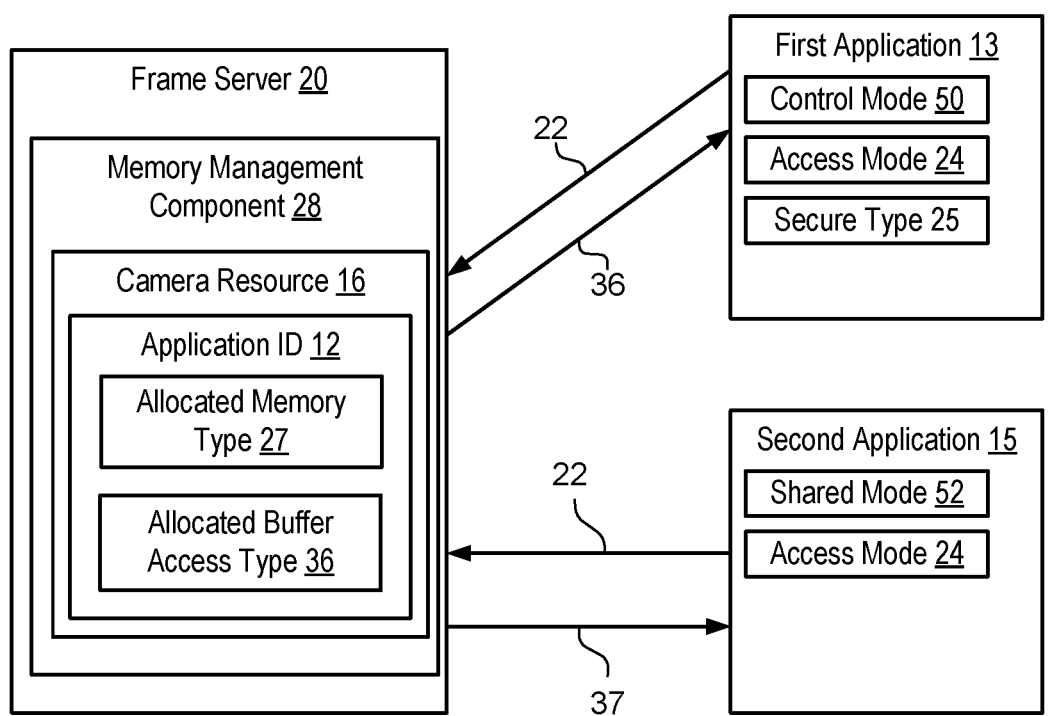
FIG. 4 is a schematic block diagram of an application sending a camera resource request for a secure memory buffer to use with a camera resource in accordance with an implementation of the present disclosure.

Referring now to FIG. 4, an example use case may include a plurality of applications 10 (e.g., first application 13 and second application 15) sending camera resource requests 22 to use a camera resource 16 associated with computer device 102 (FIG. 1) where first application 13 requests use of the camera resource 16 in a secure mode. Frame server 20 may receive the various camera resource requests 22 from first application 13 and second application 15. In the illustrated example, first application 13 may be in a control mode 50 of camera resource 16 and second application 15 may be in a shared mode 52. As such, first application 13 may determine the parameters of camera resource 16 and second application 15 may use the camera resource 16 under the existing parameters set by first application 13.

Application 10 may specify secure type 25 (FIG. 1) as the requested memory type 26 that first application 13 wants to use with camera resource 16 in the camera resource request 22. As such, memory management component 28 may execute memory allocator component 43 to use the requested memory type 26 specified in the camera resource request 22 in determining an allocated memory type 27 that identifies which type of memory to allocate to first application 13. For example, memory management component and/or memory allocator component 43 may allocate a secure type 25 corresponding to secure memory 42 as the allocated memory type 27 to use with camera resource 16.

Memory management component 28 and/or memory allocator component 43 may communicate with buffer allocator component 45 (FIG. 1) to determine an allocated buffer type 36 of the buffer 30 (FIG. 1) and a size of the buffer 30 to provide to first application 13 and second application 15. For example, when first application 13 specifies a secure type 25 as the requested memory type 26, buffer allocator component 45 may determine that the allocated buffer access type 36 for the first application 13 may be a secure type 25. Once first application 13 is allocated with a secure type 25 buffer access type 36, other applications, such as second application 15, may not be able to access camera resource 16. For example, if second application 15 sends a camera resource request 22 to use camera resource 16, frame server 20 may send a notification 37 to second application 15 indicating that the camera resource 16 is unavailable for use. Moreover, once memory management component 28 and/or buffer allocator component 45 provides a secure type 25 to first application 13 for use, the allocated buffer access type 36 selected for first application 13 may not change until first application 13 is finished using camera resource 16 and releases control of the camera resource 16.

Figure 5:
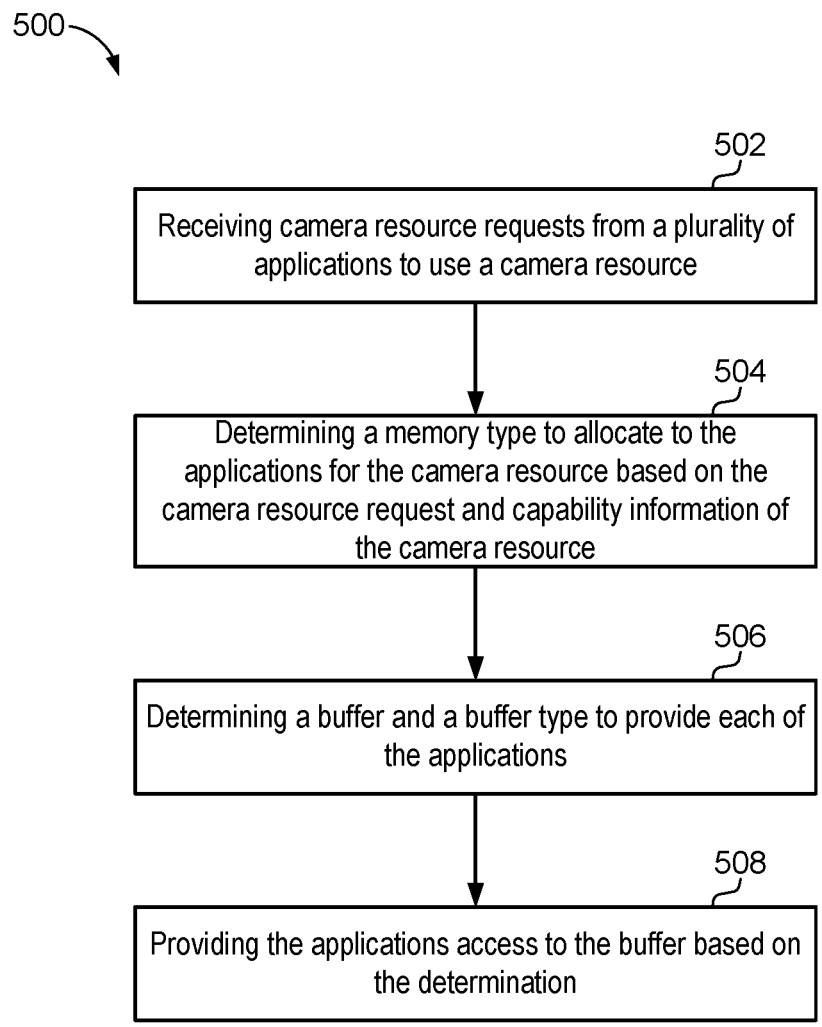
FIG. 5 is a flow diagram for an example of a method of allocating memory for use with a camera resources in accordance with an implementation of the present disclosure.

Referring now to FIG. 5, an example method 500 may be used by computer device 102 (FIG. 1) to allocate memory to applications 10 (FIG. 1) when using camera resources 16 (FIG. 1) associated with computer device 102.

At 502, method 500 may include receiving camera resource requests from a plurality of applications to use a camera resource. For example, frame server 20 (FIG. 1) may receive one or more camera resource requests 22 from applications 10 to use at least one camera resource 16. The camera resource request 22 may include the application ID 12 that identifies the application 10 requesting use of one or more of the camera resources 16, one or more camera resource IDs 17 corresponding to the requested one or more camera resources 16, and the access mode 24 that identifies a level of access to the memory and/or a memory buffer associated with the camera resource 16. The access mode 24 may include, but is not limited to, a read request, a write request, and a read and write request.

For example, application 10 may identify whether application 10 wants to use the camera resource 16 in the control mode and/or the shared mode. The camera resource request 22 may also optionally include a requested memory type 26 identified by application 10. The requested memory type 26 may include, but is not limited to, one of a plurality of values each corresponding to one of a plurality of different types of memory (e.g., system memory 40, graphics memory 18, or secure memory 42) requested to be used. For instance, computer device 102 may include one or more graphics memories 18 (e.g., up to m, where m is a positive number), where each graphics memory 18 may correspond to a respective one or more graphics processing units (GPUs) of the computer device 102. Further, computer device 102 may include at least one secure memory 42 located in a secure portion of operating system 110 which limits access to secure memory 42 to avoid tampering, etc. For example, application 10 may set the requested memory type 26 to a value corresponding to graphics memory 18 to request to use graphics memory 18 for the processing associated with the use of the identified camera resource 16.

At 504, method 500 may include determining a memory type to allocate to the applications for the camera resource based on the camera resource request and compatibility information of the camera resource. For each camera resource request 22, memory management component 28 may execute a memory allocator component 43 to determine an allocated memory type 27 that identifies which type of memory to allocate to each requesting application 10 using each requested camera resource 16. The allocated memory type 27 may identify a memory type 33 such as, but not limited to, a system type 21 corresponding to system memory 40, a graphics type 23 corresponding to graphics memory 18, and a secure type 25 corresponding to secure memory 42. When computer device 102 has a plurality of graphics memory 18 (e.g., multiple graphics processing units (GPUs)) that may be accessed, the graphics memory 18 to be allocated may be identified by a graphics memory ID 19. In addition, memory allocator component 43 may assign different types of memory for different camera resources 16. For example, allocated memory type 27 assigned by memory management component 28 may identify system memory 40 for use with a first camera resource 16 and may identify graphics memory 18 for use with a second camera resource 16. Alternatively, or in addition, memory allocator component 43 may assign the same or different types of memory for the same camera resources 16 to different applications 10. For example, allocated memory type 27 assigned by memory management component 28 may identify system memory 40 for use with both a first application 10 and a second application 10 for a first camera resource 16. Thus, in response to each camera resource request 22, memory allocator component 43 defines a memory allocation 29 that associates the application ID 12 of the requesting application with the camera resource ID 17 of the requested camera resource 16, and further associates the allocated memory type 27 with the application ID 17 to define what memory should be used by the application 10 when using the camera resource 16.

In some cases, memory allocator component 43 of memory management component 28 may use the information from the camera resource request 22, along with stored camera memory requirements or compatibility information 31, when determining the allocated memory type 27 for the requested camera resource 16. The camera requirements or compatibility information 31, which may be stored in system memory 40, may identify the memory type 33 for use with the given camera resource 16, or may identify the memory type 33 that cannot be used with the given camera resource 16. For example, application 10 may send camera resource request 22 including requested memory type 26 that identifies a request to use graphics memory 18. Memory allocator component 43 of memory management component 28 may use the camera resource ID 17 in camera resource request 22 to identify the corresponding camera resource 16 and any corresponding memory requirements 31 for the selected camera resource 16. When the requested memory type 26 matches with the camera requirements or compatibility information 31, then memory allocator component 43 of memory management component 28 may assign the requested memory type 26 to the application 10 for use with the camera resource 16. In addition, if a new application 10 requests a different requested memory type 26 than what is currently in use, memory management component 28 may update the allocated memory type 27 assigned to the application 10 based on the camera resource request 22 received from the new application. As such, the memory allocator component 43 of memory management component 28 may use any memory requirements 31 for the camera resources 16 in combination with any specific requests made by application 10 in the camera resource request 22 when determining the allocated memory type 27 assigned to the requesting application 10 for using the requested camera resource 16.

In addition to taking into account the requested memory type 26 and the camera requirements or compatibility information 31, memory allocator component 43 of memory management component 28 may switch between different memory types 33 based on power needs of computer device 102. For example, if a power level of the computer device 102 is below a power level threshold, memory allocator component 43 of memory management component 28 may switch the allocated memory type 27 to a less power consuming type of memory, as compared to an amount of power consumption of a current memory, to help conserve battery power.

At 506, method 500 may include determining a buffer and a buffer type to provide each of the applications. Memory management component 28 may also provide each application 10 access to a buffer 30 having a buffer type 34 to use in connection with the camera resource 16 in response to the camera resource request 22. Memory management component 28 may include a buffer allocator component 45 to determine the allocated buffer type 36 of the buffer 30 to provide application 10. Generally, each camera resource 16 is associated with a corresponding buffer 30, e.g., a portion or location in one of the allocated memory type 27 (e.g., the system memory 40, the graphics memory 18, or the secure memory 42) for storing the output of the camera resource 16. Further, the buffer allocator component 45 may choose between different buffer types 34, where the allocated buffer access type 36 may be one of a plurality of values that identifies one of the plurality of buffer types 34 including, but not limited to, a shared type 44, a copy type 46, and a secure type 48. The shared type 44 of buffer 30 is a common buffer in one of the memories, where the common buffer is used by two or more applications 10. The copy type 46 of buffer 30 is an independent buffer that is a copy of a primary buffer used by the camera resource. The secure type 48 of buffer 30 is a buffer in the secure memory 42 in the secure portion of the operating system 110. For instance, if multiple applications 10 are requesting use of the same camera resource 16, the buffer allocator component 45 may assign the same or different buffer types 34 to each application 10 based on the camera resource requests 22 received from the applications 10. Buffer allocator component 45 may determine what buffer type 34 to allocate to minimize buffer copying and/or memory consumption by applications 10.

Buffer allocator component 45 may use the information received in the camera resource request 22 to determine the buffer type 34 to select as the allocated buffer access type 36. For instance, buffer allocator component 45 may use the access mode 24 to determine the allocated buffer access type 36. In one implementation, for instance, buffer allocator component 45 may use the shared type 44 when the access mode 24 is read only. In addition, for instance, buffer allocator component 45 may use the copy type 46 when the access mode 24 is read and write. Thus, for each application 10 requesting the use of the camera resource 16, buffer allocator component 45 may use the access mode 24 identified in a respective camera resource request 22 to determine which buffer type 34 to assign at the allocated buffer access type 36 for use by the respective application 10 with the requested camera resource 16.

Moreover, if the access mode 24 changes for a specific application 10, buffer allocation component 45 may dynamically update the allocated buffer access type 36 assigned to the application 10. For example, if application 10 switches from a read only access mode 24 to a read/write access mode 24, the buffer type 34 changes and the allocated buffer access type 36 selected for application 10 may change from the shared type 44 to the copy type 46. By using the buffer 30 of the shared type 44 between multiple applications 10, system processing may be improved by reducing a number of copies of memory buffers required.

At 508, method 500 may include providing the applications access to the buffer based on the determination. Frame server 20 may communicate the allocated buffer access type 36 to application 10 in response to the camera resource request 22. The allocated buffer access type 36 may identify a buffer 30 and access permissions to application 10. In some cases, however, the buffer type 34 indicated by the allocated buffer access type 36 may be transparent to application 10. Thus, application 10 may use the buffer 30 provided without knowing whether the buffer 30 is the shared type 44, the copy type 46, or the secure type 48.

When applications 10 are added and/or removed from using the camera resource 16, memory management component 28 may dynamically update the memory allocation for the respective application(s) 10 based on the additions and/or removals. As each application 10 sends the camera resource request 22 for a camera operation, memory management component 28 may dynamically ensure each application 10 gets a sufficient type and amount of memory, and/or a suitable access type, by updating the buffer 30 allocated to the applications 10 based on the camera resource requests 22.

Moreover, as graphics process unit (GPU)s are added and/or removed from the computer device 102, the memory management component 28 may dynamically switch the allocated memory to a different allocated memory type 27, as needed. For example, when a user removes a keyboard portion of a tablet computer and is using a screen portion of the tablet to conduct a Skype application video call, memory management component 28 may dynamically switch the allocated memory from the graphics memory 18 on the keyboard portion to the graphics memory 18 on the screen portion of the tablet.

Thus, by intercepting all camera resource requests 22 for camera operations from the various applications 10, memory management component 28 may optimize the memory allocation process by ensuring that each application 10 gets suitable access to a sufficient type and amount of memory to use. In addition, by sharing memory buffers 30 when possible, system processing may be improved by reducing a number of copies of memory buffers required.

Figure 6:
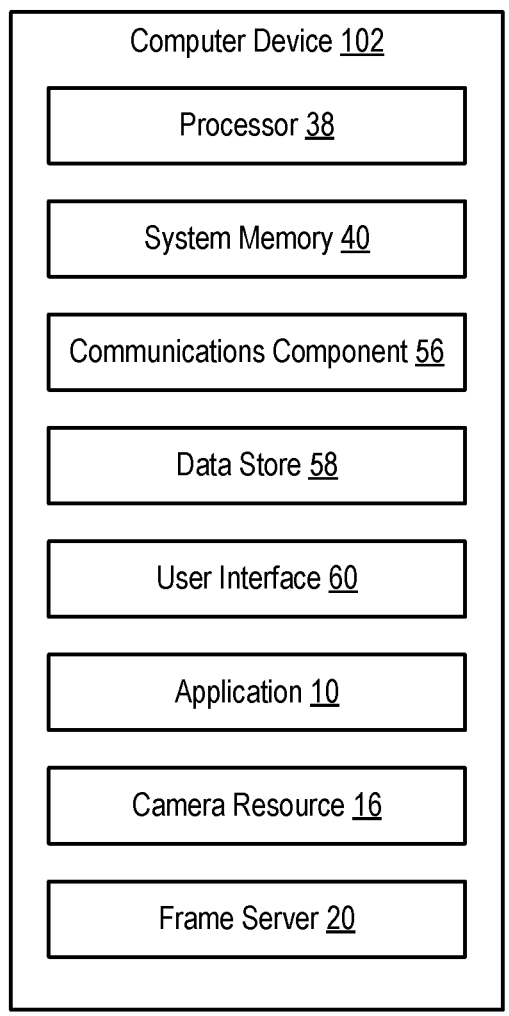
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 38 for carrying out processing functions associated with one or more of components and functions described herein. Processor 38 can include a single or multiple set of processors or multi-core processors. Moreover, processor 38 can be implemented as an integrated processing system and/or a distributed processing system.

Computer device 102 may further include system memory 40, such as for storing local versions of applications being executed by processor 38. System memory 40 can include a type of memory usable by a computer, such as random access memory (RAM), read only memory (ROM), tapes, magnetic discs, optical discs, volatile memory, non-volatile memory, and any combination thereof. Additionally, processor 38 and system memory 40 may include and execute operating system 110 (FIG. 1).

Further, computer device 102 may include a communications component 56 that provides for establishing and maintaining communications with one or more parties utilizing hardware, software, and services as described herein. Communications component 56 may carry communications between components on computer device 102, as well as between computer device 102 and external devices, such as devices located across a communications network and/or devices serially or locally connected to computer device 102. For example, communications component 56 may include one or more buses, and may further include transmit chain components and receive chain components associated with a transmitter and receiver, respectively, operable for interfacing with external devices.

Additionally, computer device 102 may include a data store 58, which can be any suitable combination of hardware and/or software, that provides for mass storage of information, databases, and programs employed in connection with implementations described herein. For example, data store 58 may be a data repository for applications 10 (FIG. 1), frame server 20 (FIG. 1), and/or camera resources 16 (FIG. 1).

Computer device 102 may also include a user interface component 60 operable to receive inputs from a user of computer device 102 and further operable to generate outputs for presentation to the user. User interface component 60 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 60 may include one or more output devices, including but not limited to a display, a speaker, a haptic feedback mechanism, a printer, any other mechanism capable of presenting an output to a user, or any combination thereof.

In an implementation, user interface component 60 may transmit and/or receive messages corresponding to the operation of applications 10, frame server 20, and/or camera resources 16. In addition, processor 38 executes applications 10, frame server 20, and/or camera resources 16 and system memory 40 or data store 58 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
a processor in communication with the memory;
an operating system in communication with the memory and the processor, wherein the operating system is operable to:
receive a plurality of camera resource requests from a plurality of applications to use a camera resource;
determine a memory type to allocate to the plurality of applications for the camera resource in response to the plurality of camera resource requests and compatibility information of the camera resource;
determine a buffer and a buffer type to provide each of the plurality of applications in response to an access mode of the camera resource, wherein the buffer type comprises one or more of a shared type, a copy type, or a secure type; and
provide each of the plurality of applications access to a respective determined buffer.

2. The computer device of claim 1, wherein the memory type comprises one or more of a secure type corresponding to secure memory, a graphics type corresponding to graphics memory, and a system type corresponding to system memory.

3. The computer device of claim 1, wherein the buffer type is the shared type when the access mode is read only.

4. The computer device of claim 1, wherein the buffer type is the copy type when the access mode is read and write.

5. The computer device of claim 1, wherein when the buffer type is the secure type and secure memory is allocated, the operating system is further operable to:
prevent additional applications from accessing the camera resource.

6. The computer device of claim 1 wherein the operating system is further operable to:
dynamically update the buffer type for the buffer when the access mode changes.

7. The computer device of claim 1, wherein the operating system is further operable to:
dynamically update the memory type allocated when memory is added or removed from the computer device.

8. The computer device of claim 1, wherein the plurality of camera resource requests include a requested memory type and the operating system is further operable to determine the memory type allocated for the camera resource by:
prioritizing the requested memory type received from the plurality of applications; and
determining the memory type to allocate for the camera resource in response to the prioritization.

9. The computer device of claim 1, wherein the operating system is further operable to:
receive a second camera resource request from at least one application of the plurality of applications that identifies a second camera resource to use;
determine the memory type to allocate to the at least one application for the second camera resource in response to the second camera resource request and compatibility information of the second camera resource;
determine the buffer and the buffer type to provide the at least one application for use with the second camera resource; and
provide the at least one application access to the determined buffer.

10. A method for allocating memory for use with a camera resources, comprising:
receiving, at an operating system executing on a computer device, a plurality of camera resource requests from a plurality of applications to use a camera resource;
determining a memory type to allocate to the plurality of applications for the camera resource in response to the plurality of camera resource requests and compatibility information of the camera resource;
determining a buffer and a buffer type to provide each of the plurality of applications in response to an access mode of the camera resource, wherein the buffer type comprises one or more of a shared, type, a copy type, or a secure type; and
providing each of the plurality of applications access to a respective determined buffer.

11. The method of claim 10, wherein the memory type comprises one or more of a secure type corresponding to secure memory, a graphics type corresponding to graphics memory, and a system type corresponding to system memory.

12. The method of claim 10, wherein the buffer type is the shared type when the access mode is read only.

13. The method of claim 10, wherein the buffer type is the copy type when the access mode is read and write.

14. The method of claim 10, wherein when the buffer type is the secure type and secure memory is allocated, the method further comprises:
preventing additional applications from accessing the camera resource.

15. The method of claim 10, further comprising:
dynamically updating the buffer type for the buffer when the access mode changes.

16. The method of claim 10, further comprising:
dynamically updating the memory type, allocated when memory is added or removed from the computer device.

17. The method of claim 10, wherein the plurality of camera resource requests include a requested memory type and determining the memory type allocated
prioritizing the requested memory type received from the plurality of applications; and
determining the memory type to allocate for the camera resource in response to the prioritization.

18. The method of claim 10, further comprising:
receiving a second camera resource request from at least one application of the plurality of applications that identifies a second camera resource to use;
determining the memory type to allocate to the at least one application for the second camera resource in response to the second camera resource request and compatibility information of the second camera resource;
determining the buffer and the buffer type to provide the at least one application for use with the second camera resource; and
providing the at least one application access to the determined buffer.

19. A non-transitory computer-readable medium storing instructions executable by a computer device, comprising:
at least one instruction for causing the computer device to receive a plurality of camera resource requests from a plurality of applications to use a camera resource;
at least one instruction for causing the computer device to determine a memory type to allocate to the plurality of applications for the camera resource in response to the plurality of camera resource requests and compatibility information of the camera resource;
at least one instruction for causing the computer device to determine a buffer and a buffer type to provide each of the plurality of applications in response to an access mode of the camera resource, wherein the buffer type comprises one or more of a shared type, a copy type, or a secure type; and
at least one instruction for causing, the computer device to provide each of the, plurality of applications access to a respective determined buffer.

* * * * *